Sept. 3, 1940.   K. KOSCHMIEDER   2,213,281

DIRECTION FINDING SYSTEM

Filed July 9, 1938

Inventor:
Kurt Koschmieder
by R.C. Hopgood
Attorney.

Patented Sept. 3, 1940

2,213,281

UNITED STATES PATENT OFFICE 2,213,281

DIRECTION FINDING SYSTEM

Kurt Koschmieder, Falkensee, East Havelland, Germany, assignor to C. Lorenz Aktiengesellschaft, Berlin-Tempelhof, Germany, a company Application July 9, 1938, Serial No. 218,382
In Germany July 10, 1937

4 Claims. (Cl. 250—11)

The present invention relates to particular arrangements in direction finding systems known per se, which operate with a plurality of individual radiators or even with combined antenna systems interconnected with one another at one point in order to compare their respective energies. Experience teaches that relevant direction finding is not always attained by systems of this type on account of the considerable difficulties which arise in connection with the elimination of horizontal polarization.

The best known antenna system of the above mentioned type is the so-called Adcock antenna system which substantially comprises four vertical radiators positioned at the four corners of a square. Such radiators are either tuned with earth—the so-called U-Adcock antenna—or spaced apart from earth—the so-called H-Adcock antenna. In order to eliminate the horizontal polarization, the oscillating antenna is balanced with respect to the antenna feed line so as to equalize to one another the currents which flow in opposite directions from the individual antennae and from the earth's surface. This balance is obtained in the heretofore known systems by the agency of a condenser. However, this equalization by the aid of a condenser is useful in such cases only that the physical length of the antenna is small as compared with the operating wavelength, since this condition is inevitably required for securing a predominantly capacitive antenna action. The use of antennae having a physical length which corresponds to the order of the operating wavelength, e. g. one-quarter of a wavelength as employed in short-wave operation, for example, affects such predominant capacitive effect of the antenna since an inductive and an ohmic component are set up.

The present invention proposes for the above mentioned cases to accomplish the necessary balance by means of an equivalent circuit which simulates the complex resistance of the antenna. This equivalent circuit comprises variable capacitive, inductive and ohmic resistances connected in series, or in parallel relation to one another.

Figure 1:
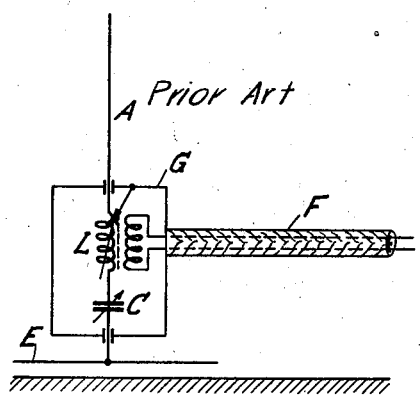
Figure 2:
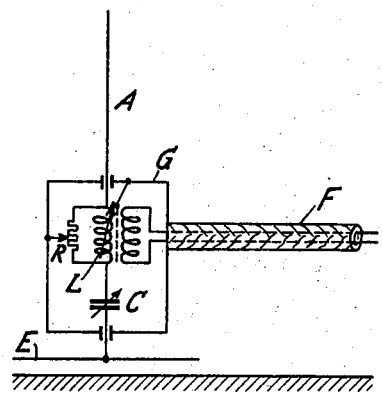
Figure 3:
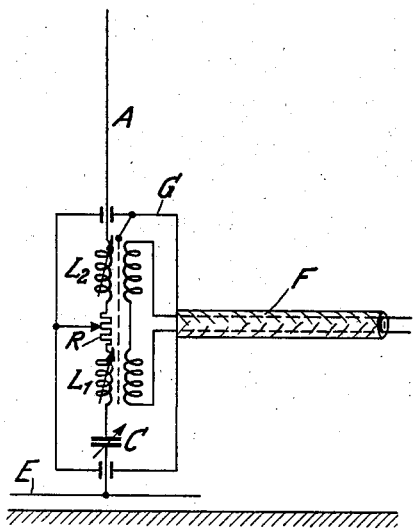
Figure 4:
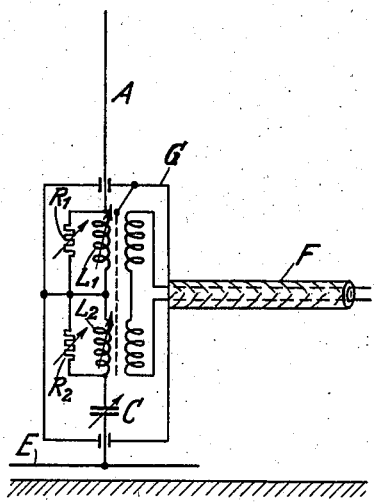

The invention will be more readily understood from the following description taken in conjunction with the accompanying drawing, in which Fig. 1 shows a known arrangement in which the antenna involves a predominant capacitive action and in which the balance is obtained by means of a condenser while the Figs. 2 to 4 illustrate different modifications of the equivalent circuit according to the invention. For the sake of simplicity, only one of the generally employed number of the individual antennae is shown in these figures.

With reference to the known arrangement shown in Fig. 1, A denotes an antenna which is connected with a counterpoise E over the primary coil L of a transformer and a balancing condenser C. The receiver or transmitter is coupled to this antenna over the secondary coil of said transformer and over the feed line F. The coil L as well as the balancing condenser C are placed in a shielding device G which is conductively connected to the shielding of the feed line F.

Fig. 2 shows an arrangement in which the physical length of the antenna is in the order of the operating wavelength so that the complex resistance of the antenna comprises a capacitive, an inductive and an ohmic component. The balance is accomplished according to the invention by means of an equivalent circuit which is constituted by the condenser C, the coil L and the resistance R. The inductance of the transformer partially in a very simple manner forms part of the equivalent circuit.

The Figs. 3 and 4 show further embodiments according to the invention and the effectiveness of these modifications substantially corresponds to that of Fig. 2. The arrangement shown in Fig. 3 comprises two inductances $L_1$ and $L_2$ with their appertaining secondary windings associated with the feed line. A variable resistance R is interposed between said two inductance coils in series relation to the antenna A, the balancing condenser C and the counterpoise E. All these circuit elements are placed within a shielding G. The Fig. 4 shows an arrangement similar to that of Fig. 3 and the sole difference is that two variable resistances $R_1$ and $R_2$ are used and shunted across the inductance coils $L_1$ and $L_2$, respectively. The essential matter which is the same for all embodiments is that the circuit between the feed line and the counterpoise is electrically equivalent to the antenna circuit.

What is claimed is:

1. In a direction finding system operating with a plurality of antennae, an antenna, a feed line, means for coupling said feed line to said antenna a counterpoise operatively associated with said antenna, and an equivalent circuit constructed and arranged to simulate the complex resistance of said antenna coupled to said antenna and counterpoise in order to secure symmetry, said equivalent circuit comprising serially connected variable capacity means, variable inductance means and variable resistance means.

2. In a direction finding system operating with a plurality of antennae, an antenna, a feed line, means for coupling said feed line to said antenna, a counterpoise operatively associated with said antenna, and an equivalent circuit constructed and arranged to simulate the complex resistance of said antenna coupled to said antenna and counterpoise in order to secure symmetry, said equivalent circuit comprising variable inductance means, variable resistance means in parallel relation to one another, and variable capacity means connected to said inductance and resistance means.

3. In a direction finding system operating with a plurality of antennae, an antenna, a feed line, means for inductively coupling said feed line to said antenna, a counterpoise operatively associated with said antenna, and an equivalent circuit constructed and arranged to simulate the complex resistance of said antenna coupled to said antenna and counterpoise in order to secure symmetry, said equivalent circuit comprising variable capacity means, variable inductance means and variable resistance means connected in predetermined relation, the inductance of said coupling means between said antenna and said feed line forming part of said equivalent circuit.

4. A direction finding system as defined in claim 3, in which said feed line is provided with a shielding sheath, further comprising a shielding member conductively connected to the sheath of said feed line and encompassing said equivalent circuit.

KURT KOSCHMIEDER.